United States Patent [19]

Juso et al.

[11] 4,384,284
[45] May 17, 1983

[54] KEYBOARD OPERATED AUDIO VISUAL SYSTEM

[75] Inventors: Hiromi Juso, Gose; Shigeki Tsuji, Tenri; Shigemi Maeda, Sakai, all of Japan

[73] Assignee: Sharp Kabushiki Kaisha, Osaka, Japan

[21] Appl. No.: 127,851

[22] Filed: Mar. 6, 1980

[30] Foreign Application Priority Data

Mar. 9, 1979 [JP] Japan .................................. 54-28142

[51] Int. Cl.³ ............................................... G09G 3/00
[52] U.S. Cl. .............................. 340/706; 340/384 E; 340/721; 340/701; 360/72.2; 434/307
[58] Field of Search ............... 340/384 E, 706, 721, 340/701; 35/5, 6, 8 A; 360/35, 72.2, 61; 434/307, 336, 338

[56] References Cited

U.S. PATENT DOCUMENTS

| | | | |
|---|---|---|---|
| 3,371,933 | 3/1968 | Weitzner | 35/5 |
| 3,751,825 | 8/1973 | Barrett | 35/6 |
| 4,005,530 | 2/1977 | Takahashi et al. | 35/8 A |
| 4,052,798 | 10/1977 | Tomita et al. | 434/307 |
| 4,142,232 | 2/1979 | Harvey | 360/72.2 |
| 4,160,242 | 7/1979 | Fowler et al. | 35/6 |
| 4,175,267 | 11/1979 | Tachi | 360/72.2 |
| 4,237,498 | 12/1980 | van Eijck et al. | 360/72.2 |
| 4,287,539 | 9/1981 | Bixby et al. | 360/72.2 |

*Primary Examiner*—Marshall M. Curtis
*Attorney, Agent, or Firm*—Birch, Stewart, Kolasch & Birch

[57] ABSTRACT

An audio visual system includes an audio cassette tape player, a central processor unit, a TV screen for displaying a desired pattern in accordance with a data derived from the audio cassette tape player, and a speaker system for providing audio announcement in accordance with information derived from the audio cassette tape player. The audio visual system displays a problem and five typical answers thereto. The student introduces his answer through a keyboard unit. When, for example, an answer key [3] is actuated, the audio visual system drives the audio cassette tape player to locate a commentary suited for response to the actuation of the answer key [3] whereby the commentary associated with answer key [3] is displayed and announced.

24 Claims, 10 Drawing Figures

FIG. 2 (PICTURE SIGNAL PROCESSOR UNIT -110-)

|     | 1  | 2  | 3  |     | 12 |
|-----|----|----|----|-----|----|
| 16  | 0F | 1F | 2F |     | BF |
|     |    |    |    |     |    |
| 6   | 05 | 15 | 25 |     | B5 |
| 5   | 04 | 14 | 24 |     | B4 |
| 4   | 03 | 13 | 23 |     | B3 |
| 3   | 02 | 12 | 22 |     | B2 |
| 2   | 01 | 11 | 21 |     | B1 |
| 1   | 00 | 10 | 20 |     | B0 |

FIG. 3

FIG. 5 (AUDIO CASSETTE TAPE PLAYER -100-)

KEYBOARD OPERATED AUDIO VISUAL SYSTEM

BACKGROUND AND SUMMARY OF THE INVENTION

The present invention relates to an audio visual system, wherein a video signal applicable to a home use television set is developed through the use of data signals derived from an audio signal recorder such as an audio cassette tape, audio open-reel tape or audio record player.

The present invention relates, more particularly, to an electronic learning aid mainly comprising the aforementioned audio visual system.

An electronically controlled audio visual system is described in U.S. Pat. No. 4,310,838 entitled, "INSTRUCTION CONTROLLED AUDIO VISUAL SYSTEM", issued on Jan. 12, 1982 and assigned to the assignee of the present application. The present invention is an improvement in the audio visual system described in this patent. Accordingly, an object of the present invention is to provide an audio visual system functioning as an electronic learning aid.

Another object of the present invention is to effectively combine an audio visual system, a tape recorder system which capable of searching a desired program recorded on a magnetic tape, and a keyboard for introducing answers to problems displayed on the audio visual system.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, audio sound information and pattern display information of problems are recorded on an audio stereo cassette tape. When a student introduces his answer to the generated problems through the use of a keyboard panel, the audio stereo cassette tape is driven to locate a suitable commentary recorded on the audio stereo cassette tape. Of course, a number of various commentaries are recorded on the audio stereo cassette tape. The cassette tape player is capable of searching ahead of a desired program recorded on the audio stereo cassette tape, and the audio visual system develops a commentary selection signal in response to the answer introduced by the student. In this way, a suitable commentary is displayed and announced in response to the answer introduced through the keyboard panel.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 3 is a chart for explaining the picture point assignment of a RAM included in the picture signal processor unit of FIG. 2;

DESCRIPTION OF THE PREFERRED EMBODIMENTS

Figure 1:
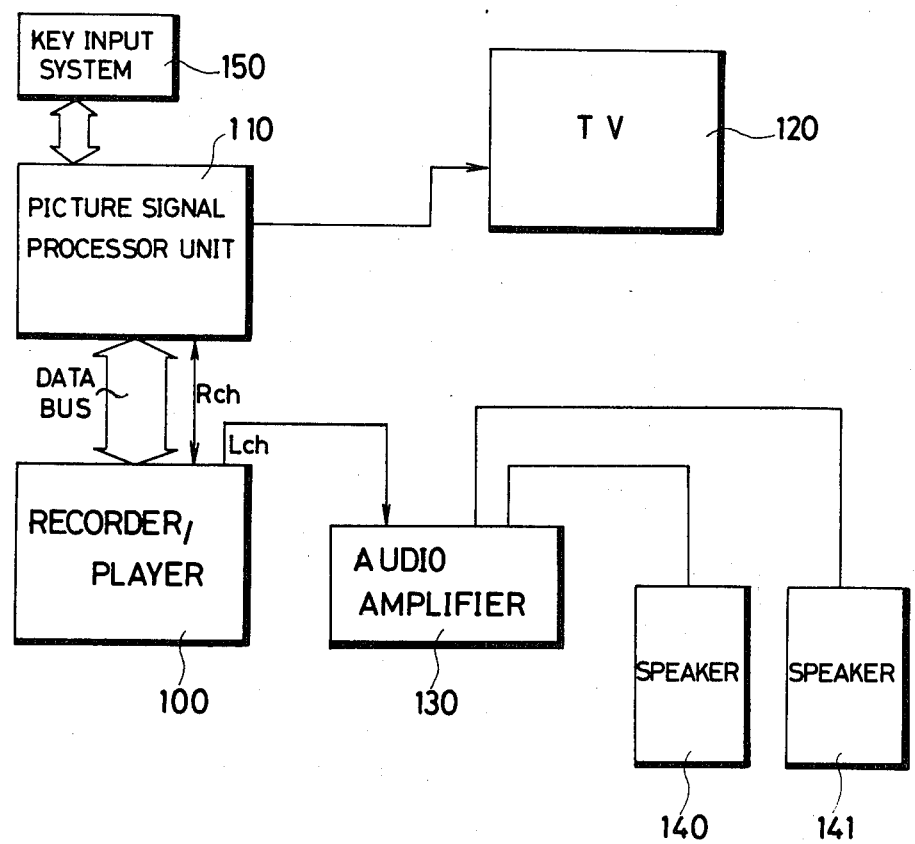
FIG. 1 is a schematic block diagram of an embodiment of an audio visual system of the present invention.

FIG. 1 schematically shows an embodiment of an audio visual system of the present invention.

The audio visual system of the present invention mainly comprises an audio cassette tape player 100, a picture signal processor unit 110, an audio amplifier 130, and a key input system 150 for achieving communication between the operator and the audio visual system. The audio cassette tape player 100 is the type which is capable of searching a head of a desired program recorded on a magnetic tape. A typical construction of the audio cassette tape player of the abovementioned type was disclosed in U.S. Pat. No. 4,014,039 entitled "AUTOMATIC PROGRAM LOCATOR FOR TAPE DECKS" issued on Mar. 22, 1977 to Tatsuhiro Yasunaga.

Reproduction signals derived from the audio cassette tape player 100 are applied to the picture signal processor unit 110 and the audio amplifier 130. More specifically, the reproduction signals include picture information signals and audio sound signals, the former being applied to the picture signal processor unit 110 and the latter to the audio amplifier 130.

The picture signal processor unit 110 develops video signals in accordance with picture information signals derived from the audio cassette tape player 100 for displaying a desired pattern on an image screen of a color TV set 120. The audio amplifier 130 is a conventional one and functions to activate speaker systems 140 and 141 in response to the audio sound signals derived from the audio cassette tape player 100.

In a preferred form, the picture information signals are recorded on, for example, the right channel of the recording medium loaded on the audio cassette tape player 100, and the audio sound signals are recorded on the left channel of the recording medium.

The audio cassette tape player 100, the picture signal processor unit 110 and the key input system 150 are correlated with each other so that a problem and typical answers are displayed on the color TV set 120 and announced from the speaker systems 140 and 141 in accordance with the data derived from the audio cassette tape player 100. When a student selects his answer through the use of the key input system 150, the audio cassette tape player 100 is driven to locate a commentary suited for the selected answer, whereby the suited commentary is displayed and announced by the audio visual system.

Figure 2:
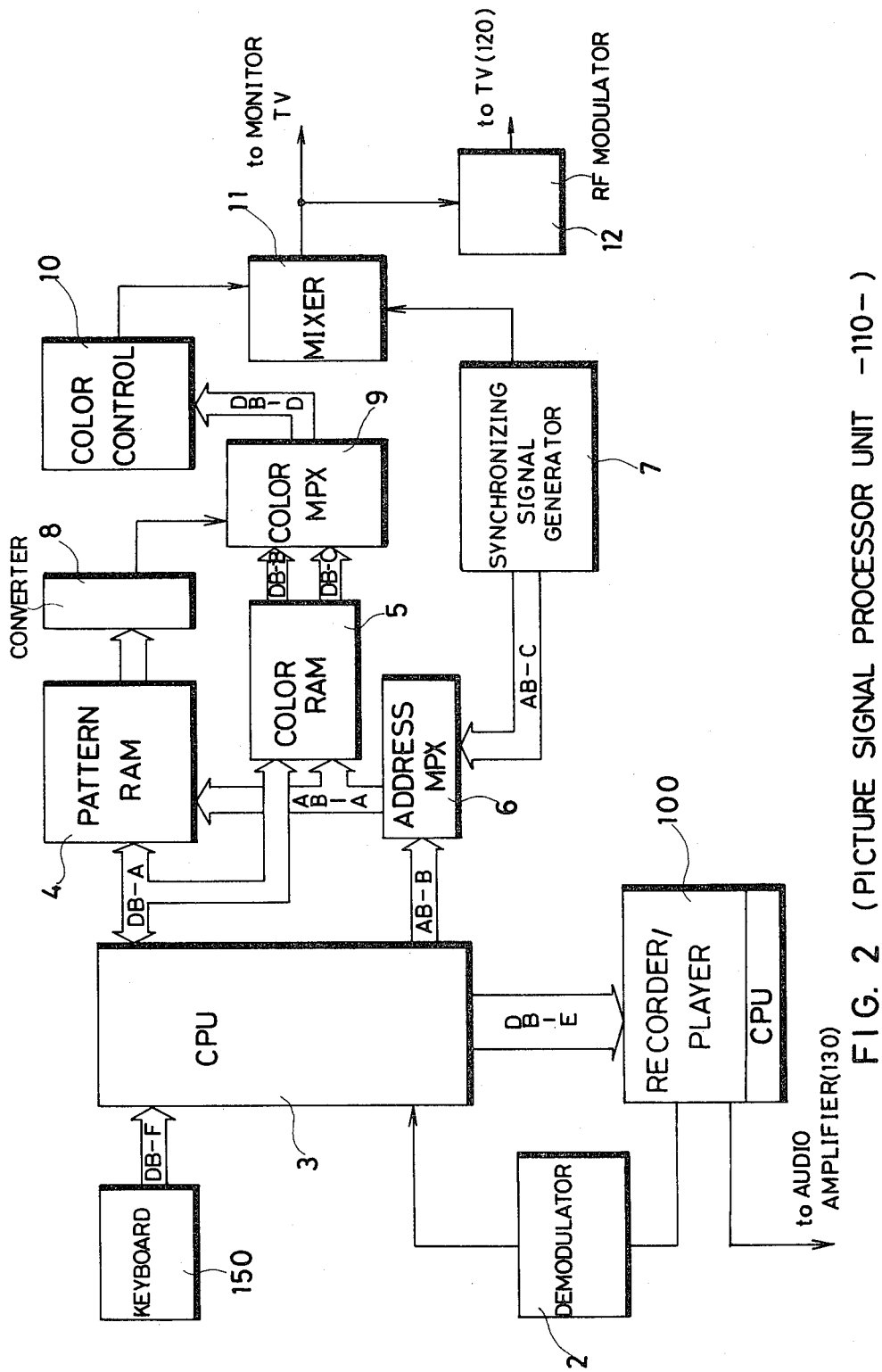
FIG. 2 is a block diagram of an embodiment of a picture signal processor unit included in the audio visual system of FIG. 1.

FIG. 2 shows an embodiment of the picture signal processor unit 110.

The picture information signals include an instruction command signal and a pattern data signal. The picture information signals reproduced by the audio cassette tape player 100 are applied to a demodulator 2, which develops demodulated digital signals in response to the picture information signals applied thereto.

The picture signal processor unit 110 mainly comprises a central processor unit 3, a pattern RAM 4 for storing digital data related to pattern information, and a color RAM 5 for storing digital data related to color information. The demodulated digital signals derived from the demodulator 2 are applied to the CPU 3, which functions to write-in the digital data into a desired section of the pattern RAM 4 and the color RAM 5 through the use of an address multiplexer 6. More specifically, the address multiplexer 6 selects a desired memory section in the RAM's 4 and 5 via address buses AB-A and AB-B while the digital data is applied from the CPU 3 to the RAM's 4 and 5 via a data bus DB-A.

When the address selection operation is not conducted in accordance with the address signal derived from the CPU 3, the address multiplexer 6 receives the address selection signal derived from a synchronizing signal generator 7 via an address bus AB-C. At this moment, the pattern RAM 4 and the color RAM 5 develop the pattern data and the color data, respectively, in response to the synchronizing signal developed from the synchronizing signal generator 7.

The pattern RAM 4 is a random access memory into which the pattern data is written in a selected address (memory block), and from which the pattern data is read out for display purposes.

More specifically, the TV screen is divided into 192 blocks (16×12 blocks) as shown in FIG. 3. Each block comprises 8×8 picture points. And, each picture point corresponds to one bit in the pattern RAM 4. In a preferred form, a row of eight picture points in each block is assigned a specific address, and a pattern data of eight bits is stored in each address of the pattern RAM 4.

The color RAM 5 is a random access memory into which the color data is written in a selected address (memory block), and from which the color data is read out for display purposes.

More specifically, the TV screen is divided into 192 blocks (16×12 blocks) as shown in FIG. 3, and each block is assigned a specific address. Each address corresponds to one memory block comprising eight bits. Each set of the eight bits in the color RAM 5 stores a background color data for determining the color of the background, and a pattern color data for determining the color of the pattern displayed on the TV screen.

In a preferred form, the color data is represented by a three bit signal. In this case, the first bit in each memory block is a blank bit, the second through fourth bits represent the background color data, the fifth bit is a blank bit, and the sixth through eighth bits represent the pattern color data as shown below.

| 0 | 0 | 1 | 0 | 0 | 0 |
|---|---|---|---|---|---|

The color data is coded as shown in the following CHART I.

CHART I

| COLOR | (Color Code) CODE | | |
|---|---|---|---|
| black | 0 | 0 | 0 |
| blue | 0 | 0 | 1 |
| green | 0 | 1 | 0 |
| cyan | 0 | 1 | 1 |
| red | 1 | 0 | 0 |
| magenta | 1 | 0 | 1 |
| yellow | 1 | 1 | 0 |
| white | 1 | 1 | 1 |

Of course, a four bit code signal can be employed to increase the color information.

The synchronizing signal generator 7 develops the horizontal synchronizing signal, the vertical synchronizing signal, and the address selection signal for selecting addresses in the pattern RAM 4 and the color RAM 5.

The picture signal processor unit 110 further comprises a parallel-to-serial converter 8, a color multiplexer 9, a color control circuit 10, and a mixer 11. The eight bit pattern data read out from the selected address in the pattern RAM 4 is converted into a serial signal by the parallel-to-serial converter 8 in response to the synchronizing signals derived from the synchronizing signal generator 7. The thus obtained serial data signal is applied to the color multiplexer 9, which functions to connect a data bus DB-C for the background color information to a data bus DB-D when the data signal applied from the converter 8 is "0", and connect a data bus DB-B for the pattern color information to the data bus DB-D when the data signal from the converter 8 is "1".

At this moment, the color RAM 5 develops the pattern color data of the selected address through the data bus DB-B, and the background color data of the selected address through the data bus DB-C. Accordingly, the data bus DB-D transfers the pattern color data when the data signal from the converter 8 bears the logic value "1", and the background color data when the data signal from the converter 8 bears the logic value "0".

The color control circuit 10 develops a color control signal in accordance with the color data applied through the data bus DB-D. The signal conversion is based on the color code listed in the CHART I. The thus developed color control signal is applied to the mixer 11, which also receives the horizontal synchronizing signal and the vertical synchronizing signal derived from the synchronizing signal generator 7, thereby providing a video signal. The thus obtained video signal is applied to an RF modulator 12, which develops a TV signal to be applied to the home use TV set 120 through an antenna terminal. The video signal derived from the mixer 11 can be applied directly to a monitor TV.

The present audio visual system is responsive to an instruction command derived from the audio cassette tape player 100. An example of the instruction commands is listed in the following CHART II.

CHART II

| INSTRUCTION | (Instruction Command Code) CODE | | DATA |
|---|---|---|---|
| | black | 20 | |
| | blue | 21 | |
| (i) | green | 22 | |

CHART II-continued

| INSTRUCTION | (Instruction Command Code) | | DATA |
|---|---|---|---|
| | CODE | | |
| UNICOLOR SELECTION FOR THE ENTIRE SCREEN | cyan<br>red<br>magenta<br>yellow<br>white | 23<br>24<br>25<br>26<br>27 | |
| (ii) BACKGROUND COLOR CHANGE | black<br>blue<br>green<br>cyan<br>red<br>magenta<br>yellow<br>white | 30<br>31<br>32<br>33<br>34<br>35<br>36<br>37 | (FIRST BLOCK NUMBER) (LAST BLOCK NUMBER) |
| (iii) PATTERN COLOR CHANGE | black<br>blue<br>green<br>cyan<br>red<br>magenta<br>yellow<br>white | 40<br>41<br>42<br>43<br>44<br>45<br>46<br>47 | (FIRST BLOCK NUMBER) (LAST BLOCK NUMBER) |
| (iv) SHIFT | left<br>right<br>up<br>down | 52<br>56<br>53<br>57 | (FIRST BLOCK NUMBER) (LAST BLOCK NUMBER) |
| (v) SMALL LETTER | black<br>blue<br>green<br>cyan<br>red<br>magenta<br>yellow<br>white | 60<br>61<br>62<br>63<br>64<br>65<br>66<br>67 | (FIRST BLOCK NUMBER) (LAST BLOCK NUMBER)<br>(PATTERN DATA) |
| (vi) CAPITAL LETTER | black<br>blue<br>green<br>cyan<br>red<br>magenta<br>yellow<br>white | 70<br>71<br>72<br>73<br>74<br>75<br>76<br>77 | (FIRST BLOCK NUMBER) (LAST BLOCK NUMBER)<br>(PATTERN DATA) |

The information signal is recorded on the recording medium loaded on the audio cassette tape player 100 in the order as shown in the CHART II.

For example, when the entire TV screen is desired to be colored blue, a code signal "21" is recorded on the recording medium. When only the background color is desired to be changed, a code signal in the group (ii), for example, "37" is used, and the first block number data and the last block number data subject to the color change follow the code signal "37". In this case, the background color of the TV screen from the selected first block number to the selected last block number is changed to white. When only the pattern color is desired to be changed, a code signal in the group (iii), for example, "42" is used, and the first block number data and the last block number data subject to the color change follow the code signal "42". In this case, the pattern color on the TV screen in the region from the selected first block number to the selected last block number is changed to green. When the display is desired to be shifted upward by one block, a code signal "53" is used and the first block number data and the last block number data subject to the shift operation follow the code signal "53".

With respect to the small letter display, wherein one character is displayed in one block by a selected color, a code signal in the group (v), for example, "66" is used. The first block number and the last block number between which the small letter is desired to be displayed are determined, and then the pattern data of the small letter to be displayed is recorded on the recording medium. With respect to the capital letter display, wherein one character is displayed in a region extending over four blocks, a code signal in the group (vi), for example, "73" is used. The first block number data and the last block number data between which the capital letter is desired to be displayed appear after the code signal "73", and then the pattern data of the capital letter to be displayed follows the block number data.

The pattern data for the small letter comprises an eight byte signal. The eight byte signal is provided by a desired number corresponding to the character number to be displayed. The pattern data for the capital letter comprises a thirty-two byte signal. The thirty-two byte signal is stored by a desired number corresponding to the character number to be displayed.

The above-mentioned code signal, block number data, and the pattern data are introduced into the CPU 3, which functions to write-in the information into the selected block in the pattern RAM 4 and the color RAM 5. More specifically, the CPU 3 comprises a determination section for determining the instruction command applied thereto, and a write-in control section for performing the data write-in operation into the selected block of the pattern RAM 4 and the color RAM 5 in accordance with the instruction command.

Figure 4:
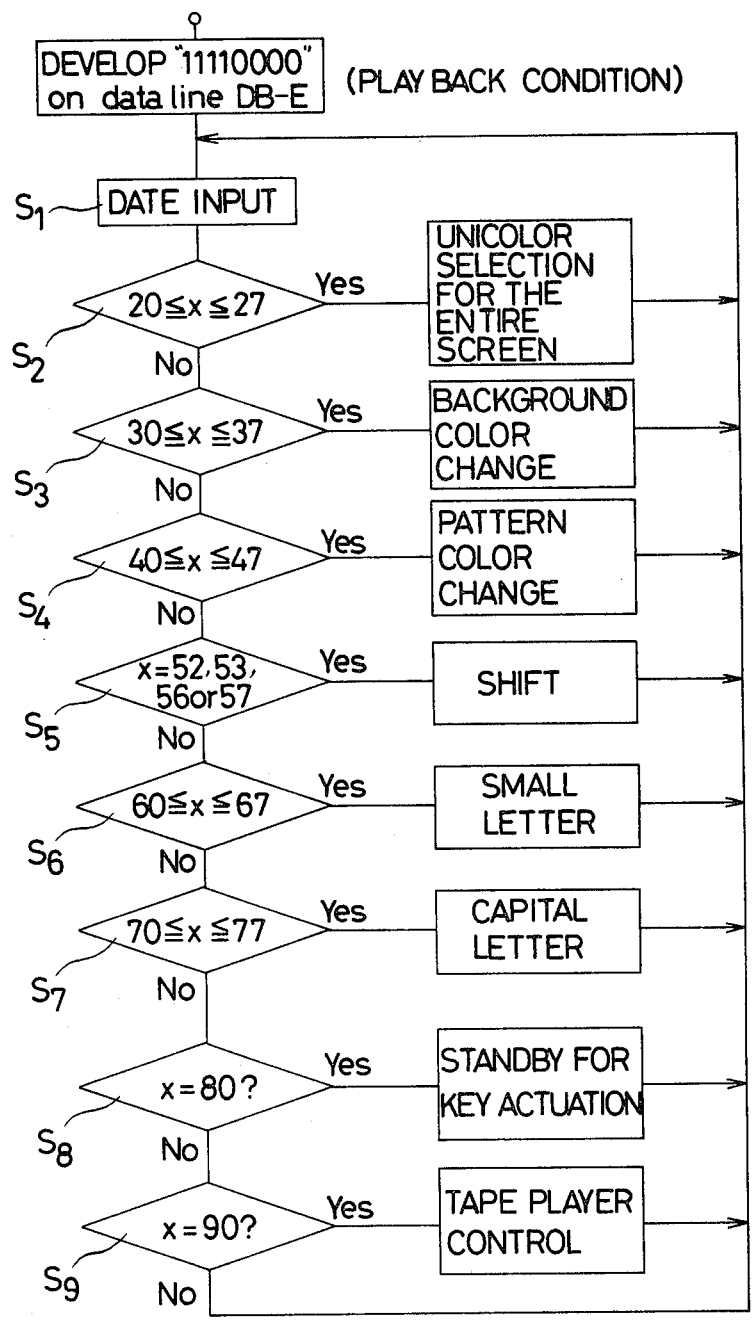
FIG. 4 is a flow chart for explaining a basic operation mode of the audio visual system of FIG. 1.

Detailed operational modes of the CPU 3 will be described with reference to FIG. 4. In this example, all data is represented by hexadecimal notation.

When the audio cassette tape player 100 is placed in the normal playback mode, the data signal is introduced from the demodulator 2 to the CPU 3 at a first step $S_1$.

If the code signal between "20" and "27" (inclusive of "20" and "27") is detected at a step $S_2$, the program is advanced to the "UNICOLOR SELECTION FOR THE ENTIRE SCREEN" mode. When the code signal between "30" and "37" (inclusive of "30" and "37") is detected at a step $S_3$, the program is advanced to the "BACKGROUND COLOR CHANGE" mode. If the code signal between "40" and "47" (inclusive of "40" and "47") is detected at a step $S_4$, the program is advanced to the "PATTERN COLOR CHANGE" mode. When the code signal 52, 53, 56 or 57 is detected at a step $S_5$, the program is advanced to the "SHIFT" mode. In the case where the code signal between "60" and "67" (inclusive of "60" and "67") is detected at a step $S_6$, the program is advanced to the "SMALL LETTER" mode. If the code signal between "70" and "77" (inclusive of "70" and "77") is detected at a step $S_7$, the program is advanced to the "CAPITAL LETTER" mode. When the code signal "80" is detected at a step $S_8$, the system is placed in a condition wherein the key code signal derived from the key input system 150 is introduced into the CPU 3. When the code signal "90" is detected by a step $S_9$, the CPU 3 develops a control signal on a data bus DB-E for driving the audio cassette tape player 100.

[UNICOLOR SELECTION FOR THE ENTIRE SCREEN]

When, for example, a code signal "21" is applied to the CPU 3, the CPU 3 functions to introduce the data "0" into the entire blocks of the pattern RAM 4, and the data "001" identifying "blue" into the background color data section and the pattern color data section of the entire blocks of the color RAM 5.

[BACKGROUND COLOR CHANGE]

When, for example, a data signal "37, 10, 1F" is introduced into the CPU 3, the CPU 3 functions to change the color data for the background in the blocks "10" through "1F" in the color RAM 5 to represent "white", namely, "111".

[PATTERN COLOR CHANGE]

When, for example, a data signal "42, 22, 25" is introduced into the CPU 3, the CPU 3 functions to change the color data stored in the pattern section in the blocks "22" through "25" in the color RAM 5 to represent "green", namely, "010".

[SHIFT]

When, for example, a data signal "53, 10, 1F" is introduced into the CPU 3, the information displayed on the section "10" through "1F" is shifted upward by one block. In other words, the pattern data stored in the memory blocks "10" through "1F" in the pattern RAM 4 is transferred to and stored in the memory blocks "00" through "0F", and a data "0" is introduced into the memory blocks "10" through "1F" of the pattern RAM 4.

[SMALL LETTER]

When, for example, a data signal "66, 04, 05, (eight byte data for the small letter "a"), (eight byte data for the small letter "b")" is introduced into the CPU 3, the eight byte pattern data for the small letter "a" is introduced into the memory block "04" of the pattern RAM 4, and the eight byte pattern data for the small letter "b" is introduced into the memory block "05" of the pattern RAM 4. Moreover, the color code data "110" for yellow is introduced into the pattern color information section of the memory blocks "04" and "05" of the color RAM 5.

[CAPITAL LETTER]

When, for example, a data signal "73, 11, 13, (thirty-two byte data for the capital letter "A"), (thirty-two byte data for the capital letter "B")" is introduced into the CPU 3, the thirty-two byte data for the capital letter "A" is introduced into the memory blocks "11", "12", "21" and "22" of the pattern RAM 4, and the thirty-two byte data for the capital letter "B" is introduced into the memory blocks "13", "14", "23" and "24" of the pattern RAM 4. Moreover, a color code data "011" for defining cyan is introduced into the pattern color information section of the memory blocks "11", "12", "21", "22", "13", "14", "23" and "24" of the color RAM 5.

The above-mentioned modes of operation are described, in detail, in U.S. Pat. No. 4,310,830, issued on Jan. 12, 1982 and entitled "INSTRUCTION CONTROLLED AUDIO VISUAL SYSTEM".

The thus introduced data written in the pattern RAM 4 and the color RAM 5 is applied to the color multiplexer 9 in response to the address selection signals derived from the synchronizing signal generator 7, whereby display is achieved on the TV set 120.

The present invention is to apply the above-mentioned audio visual system to an electronic learning aid. More specifically, a problem and five typical answers are displayed and announced by the audio visual system, and a student selects his answer through the use of five keys provided on the key input system 150. In response to the selected answer the CPU 3 develops a control signal for driving the audio cassette tape player 100 for reproducing a commentary suited to the selected answer.

The audio cassette tape player 100 is the type which responds to a nonrecorded section provided between two adjacent programs recorded on a magnetic tape.

Figure 5:
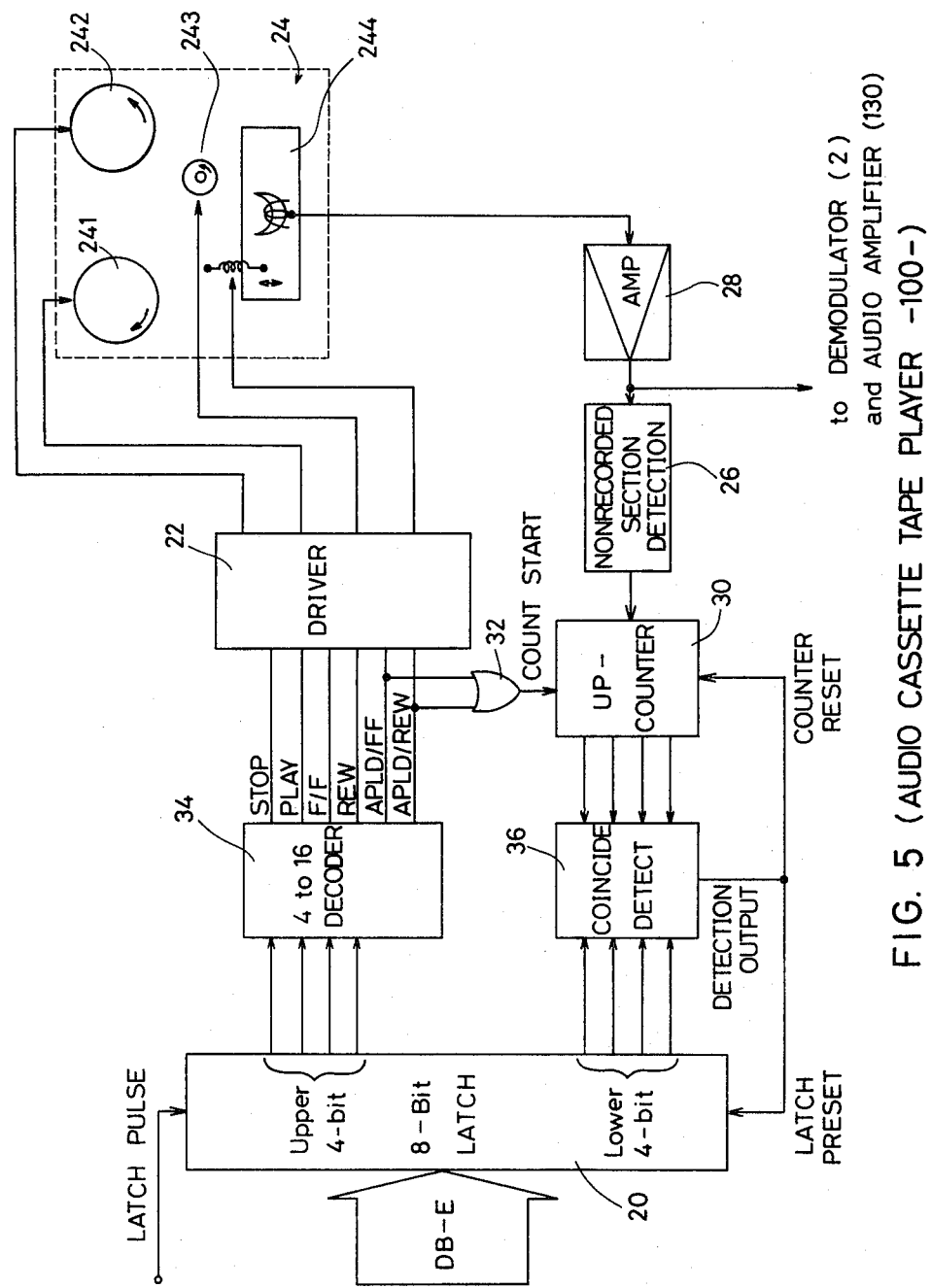
FIG. 5 is a block diagram of a cassette tape player included in the audio visual system of FIG. 1.

FIG. 5 shows an embodiment of the audio cassette tape player 100.

The audio cassette tape player 100 mainly comprises an eight-bit latch circuit 20 for receiving a control signal derived from the CPU 3 via the data bus DB-E, a tape driver circuit 22, a mechanical driver 24 for driving the magnetic tape, and a nonrecorded section detection circuit 26. The mechanical driver 24 comprises a tape feed motor 241, a tape rewind motor 242, a capstan motor 243, and a head shift solenoid 244. A reproduction signal derived from a magnetic head is applied to an amplifier 28. An output signal of the amplifier 28 is applied to the demodulator 2 for reproducing the picture information and to the audio amplifier 130 for reproducing the audio sound. The output signal of the amplifier 28 is also applied to the nonrecorded section detection circuit 26, which develops a nonrecorded section detection signal when the nonrecorded section is detected while the magnetic tape is driven to travel in the fast forward mode or the fast rewind mode.

Figure 6:
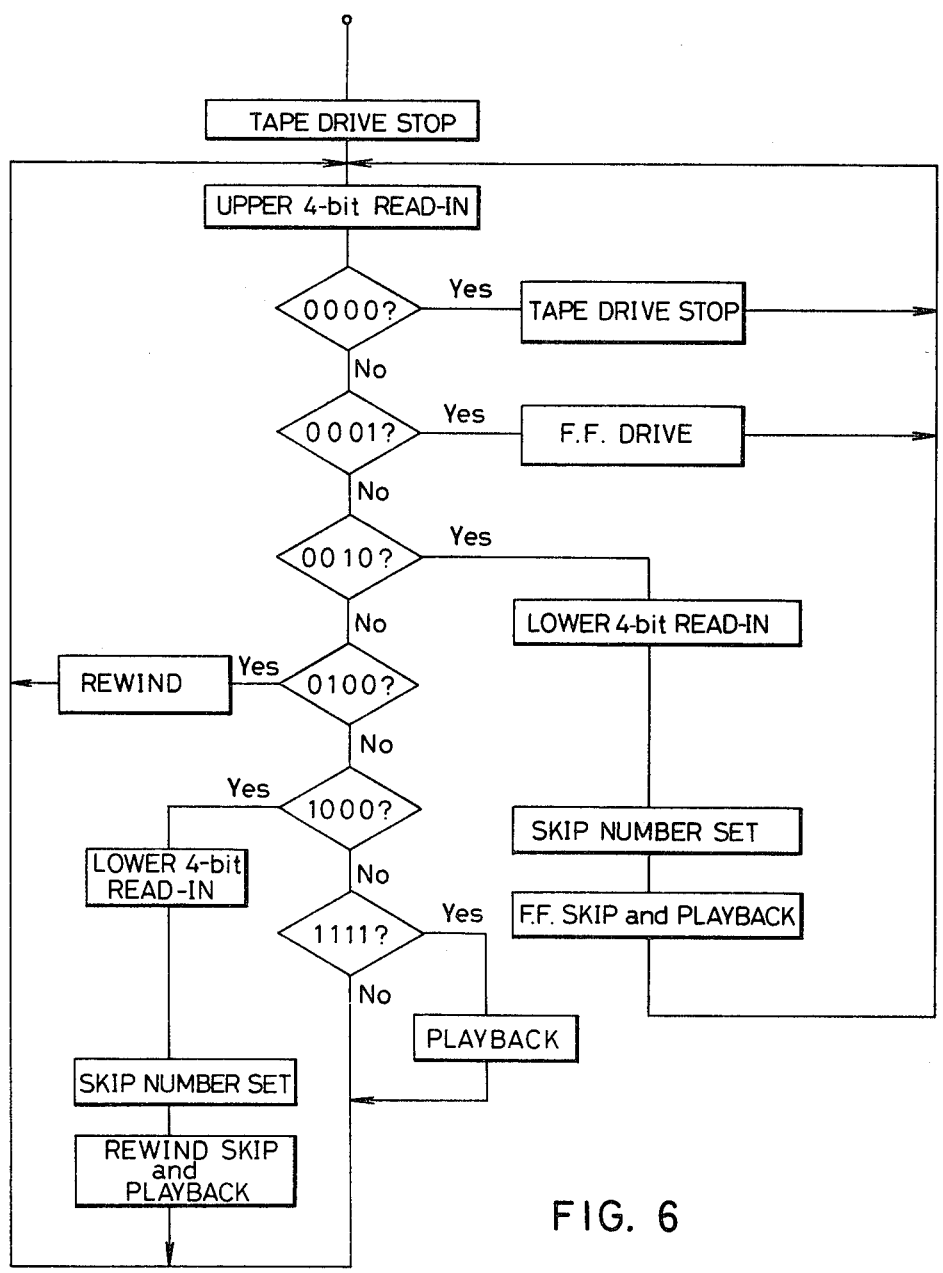
FIGS. 6 through 8 are flow charts for explaining operation modes of the audio visual system of FIG. 1.

The audio cassette tape player 100 further comprises an upcounter 30 which counts up the nonrecorded section detection signal derived from the nonrecorded section detection circuit 26, and an OR gate 32 for activating the up-counter 30 when the audio cassette tape player 100 is placed in the program search mode. The control signal applied to the eight-bit latch circuit 20 comprises an upper four-bit signal for controlling the tape drive mechanism, and a lower four-bit signal for defining a program number to be skipped. The upper four-bit signal is applied to a decoder 34, and the lower four-bit signal is applied to a coincidence detection circuit 36. When the preselected programs have been skipped, the coincidence detection circuit 36 develops a detection output to return the system into the normal playback mode. Operation modes of the audio cassette tape player 100 will be described with reference to FIG. 6.

The decoder 34 develops various tape drive control signals in response to the upper four-bit signal applied thereto. More specifically, when the upper four-bit signal is "0000", the decoder 34 develops a control signal for stopping the tape drive. When the upper four-bit signal is "0001", the tape player 100 is placed in the fast forward drive mode. When the upper four-bit signal is "0100", the decoder 34 develops a rewind control signal, and when the upper four-bit signal is "1111", a normal playback control signal is developed.

When the upper four-bit signal is "0010", the audio cassette tape player is placed in a program search mode under the fast forward movement. When the upper four-bit signal is "1000", the audio cassette tape player is placed in a program search mode under the fast rewind movement. More specifically, when the control signal derived through the data bus DB-E is "00100011", the tape drive is conducted at the fast forward movement to the third program, and the third program is played back. That is, when the coincidence detection output is developed from the coincidence detection circuit 36, the upper four-bit of the latch circuit 20 is forced to "1111" to perform the normal playback operation.

The thus obtained drive control signal is applied to the tape driver circuit 22 for activating the respective elements 241 through 244. The following CHART III shows the respective drive condition responding to the control signal derived from the decoder 34.

CHART III

| CONTROL SIGNAL | (TAPE DRIVER 22) | | | | | |
|---|---|---|---|---|---|---|
| | STOP | PLAY | F/F | REW | APLD F/F | APLD REW |
| TAPE FEED MOTOR 241 | 0 | 0 | 0 | 1 | 0 | 1 |
| TAPE REWIND MOTOR 242 | 0 | 1 | 1 | 0 | 1 | 0 |
| CAPSTAN MOTOR 243 | 0 | 1 | 0 | 0 | 0 | 0 |
| HEAD SHIFT SOLENOID 244 | 0 | 1 | 0 | 0 | 1 | 1 |

(1 : ON, 0 : OFF)

When the heat shift solenoid 244 is off, the magnetic head is separated from the magnetic tape. In the CHART III, APLD F/F represents a condition wherein the program search operation is conducted under the fast forward movement drive, and APLD REW represents a condition wherein the program search operation is conducted under the fast rewind movement drive.

As already discussed above, the key input system 150 comprises five key switches for introducing a student's answer. When any one of the key switches is actuated by the student, the key code signal is applied to the CPU 3. The following command data is recorded on the magnetic tape loaded on the audio cassette tape player 100 in order to place the audio cassette tape player 100 into a desired operation mode suited for the actuated key.

80 . . . STAND-BY FOR KEY ACTUATION
xx . . . Operation mode of the audio cassette tape player 100 when the answer key [1] is actuated.
xx . . . Operation mode of the audio cassette tape player 100 when the answer key [2] is actuated.
xx . . . Operation mode of the audio cassette tape player 100 when the answer key [3] is actuated.
xx . . . Operation mode of the audio cassette tape player 100 when the answer key [4] is actuated.
xx . . . Operation mode of the audio cassette tape player 100 when the answer key [5] is actuated.

The operation command "xx" is listed in the following CHART IV.

CHART IV

| | (OPERATION COMMAND) | | | |
|---|---|---|---|---|
| Operation Mode | Operation Command | CONTENTS | Control Signal Applied to the Player 100 through DB-E | |
| STOP | 00 | STOP | 0000 | 0000 |
| FF | 10 | WIND-UP THE ENTIRE TAPE | 0001 | 0000 |
| | 11 | ONE PROGRAM SKIP | 0010 | 0001 |
| | 12 | TWO PROGRAMS SKIP | 0010 | 0010 |
| | 13 | THREE PROGRAMS SKIP | 0010 | 0011 |
| | 14 | FOUR PROGRAMS SKIP | 0010 | 0100 |
| | 15 | FIVE PROGRAMS SKIP | 0010 | 0101 |
| | 16 | SIX PROGRAMS SKIP | 0010 | 0110 |
| | 17 | SEVEN PROGRAMS SKIP | 0010 | 0111 |
| RE-WIND | 20 | WIND-UP THE ENTIRE TAPE | 0100 | 0000 |
| | 21 | ONE PROGRAM SKIP | 1000 | 0001 |
| | 22 | TWO PROGRAMS SKIP | 1000 | 0010 |
| | 23 | THREE PROGRAMS SKIP | 1000 | 0011 |
| | 24 | FOUR PROGRAMS SKIP | 1000 | 0100 |
| | 25 | FIVE PROGRAMS SKIP | 1000 | 0101 |
| | 26 | SIX PROGRAMS SKIP | 1000 | 0110 |
| | 27 | SEVEN PROGRAMS SKIP | 1000 | 0111 |
| PLAY | 30 | PLAYBACK | 1111 | 0000 |

Figure 7:
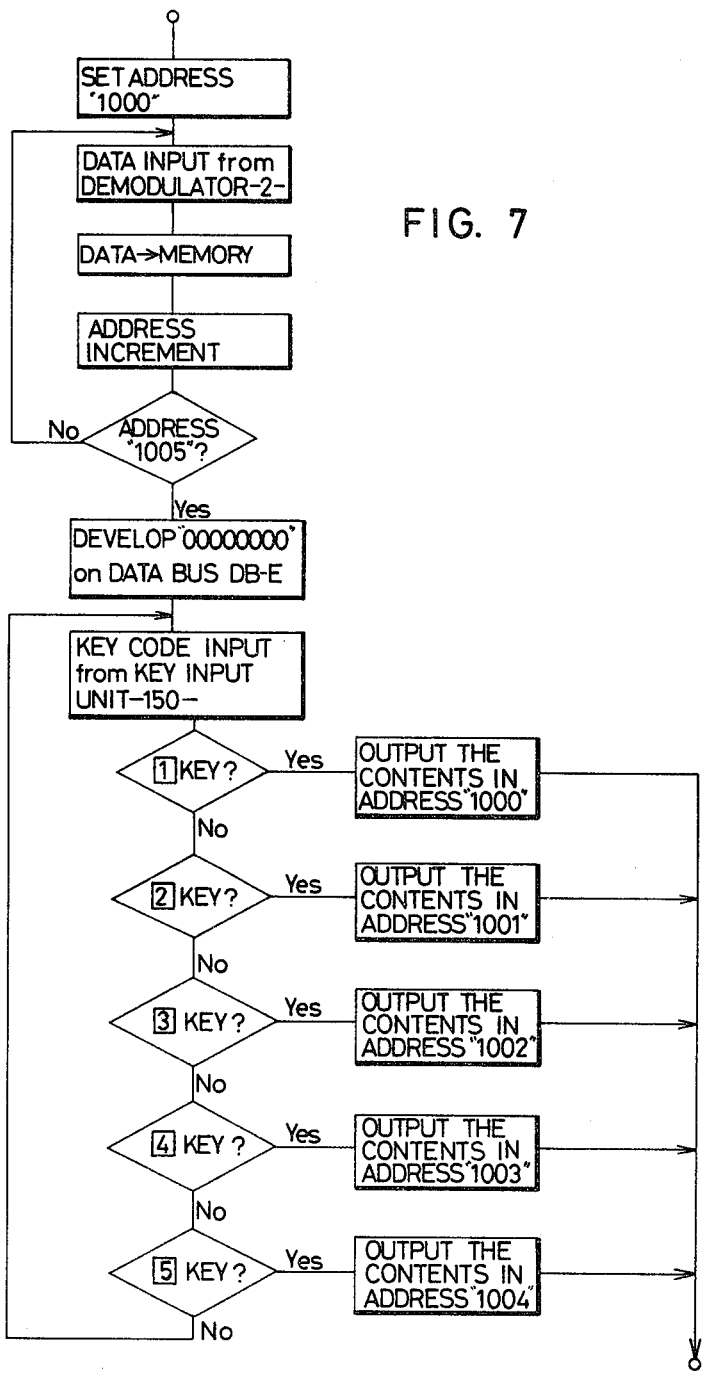

That is, when the command data "80" is reproduced by the audio cassette tape player 100, the audio visual system is placed in a condition, wherein the following reproduction condition is dependent on the answer key actuated by the student. FIG. 7 shows the operation flow responsive to the answer key actuation.

Figure 8:
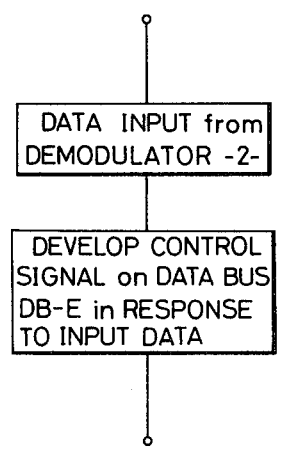

The magnetic tape further records the operation command data "90" for controlling the operation mode of the audio cassette tape player 100. When the command data "90" is reproduced from the audio cassette tape player 100, the CPU 3 is operated in a manner shown in FIG. 8, thereby controlling the operation mode of the audio cassette tape player 100.

Now assume that a problem and five typical answers are displayed on the TV set 120 and the command data "80" is reproduced by the audio cassette tape player 100. The program is advanced to the flow chart shown in FIG. 7. The following five data entries are successively introduced into the addresses "1000" through "1004" in the storage section of the CPU 3. More specifically, the first data entry is "30" for placing the audio cassette tape player 100 into the normal playback mode, which should be conducted when the answer key [1] is actuated. The second data entry is "11" for placing the audio cassette tape player 100 into the one program skip mode in the fast forward movement, which should be conducted when the answer key [2] is actuated. The third data entry is "12" for placing the audio cassette tape player 100 into the two program skip mode in the fast forward movement, which should be conducted when the answer key [3] is actuated. The fourth data entry is "13" for placing the audio cassette tape player 100 into the three program skip mode in the fast forward movement, which should be conducted when the answer key [4] is actuated. The fifth data entry is "14" for placing the audio cassette tape player 100 into the four program skip mode in the fast forward movement, which should be conducted when the answer key [5] is actuated.

Under these conditions when the answer key [3] is actuated, the control signal "00100010" is applied from the CPU 3 to the eight-bit latch circuit 20. The audio cassette tape player 100 is placed in the fast forward mode, and when two programs have skipped, the coincidence detection circuit 36 develops the detection output, whereby the audio cassette tape player 100 is placed in the normal playback mode to reproduce the commentary suited for the answer key [3].

Figure 9:
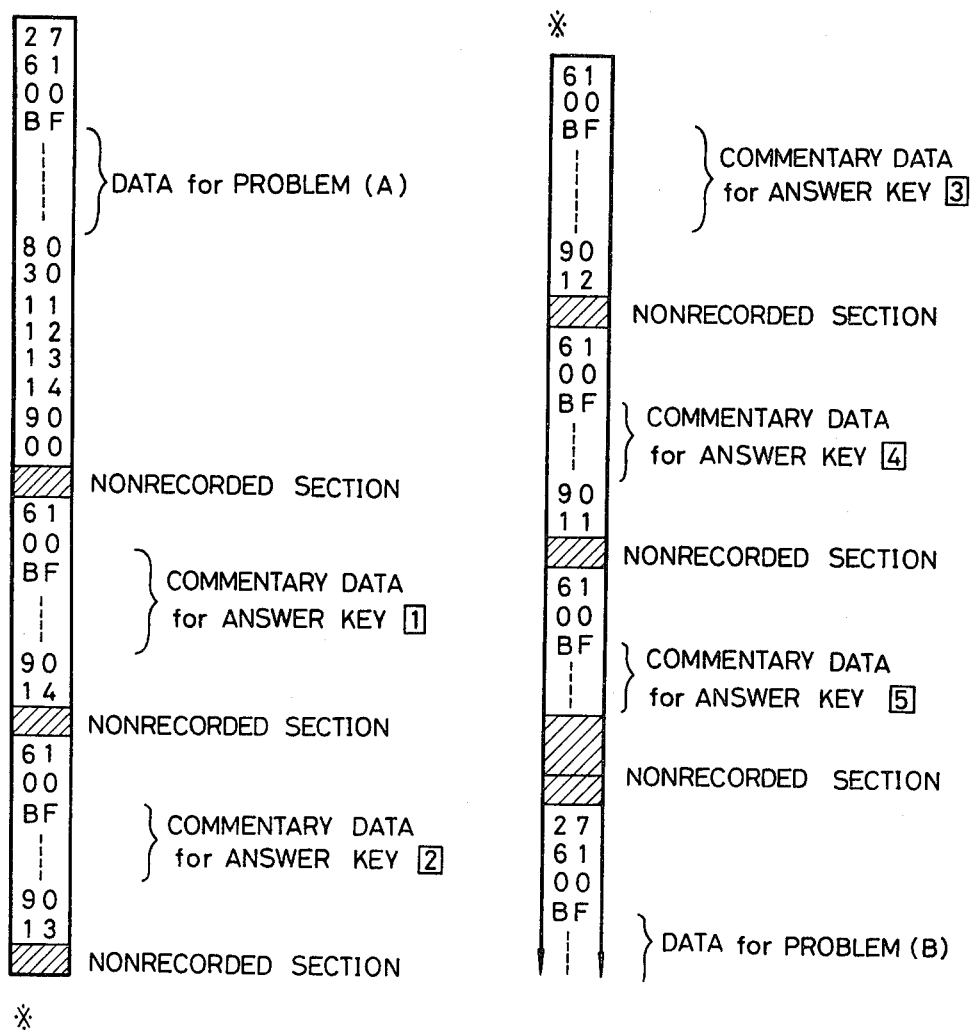
FIG. 9 is a chart showing an example of data recorded on a magnetic tape loaded on the cassette tape player of FIG. 5.
Figure 10:
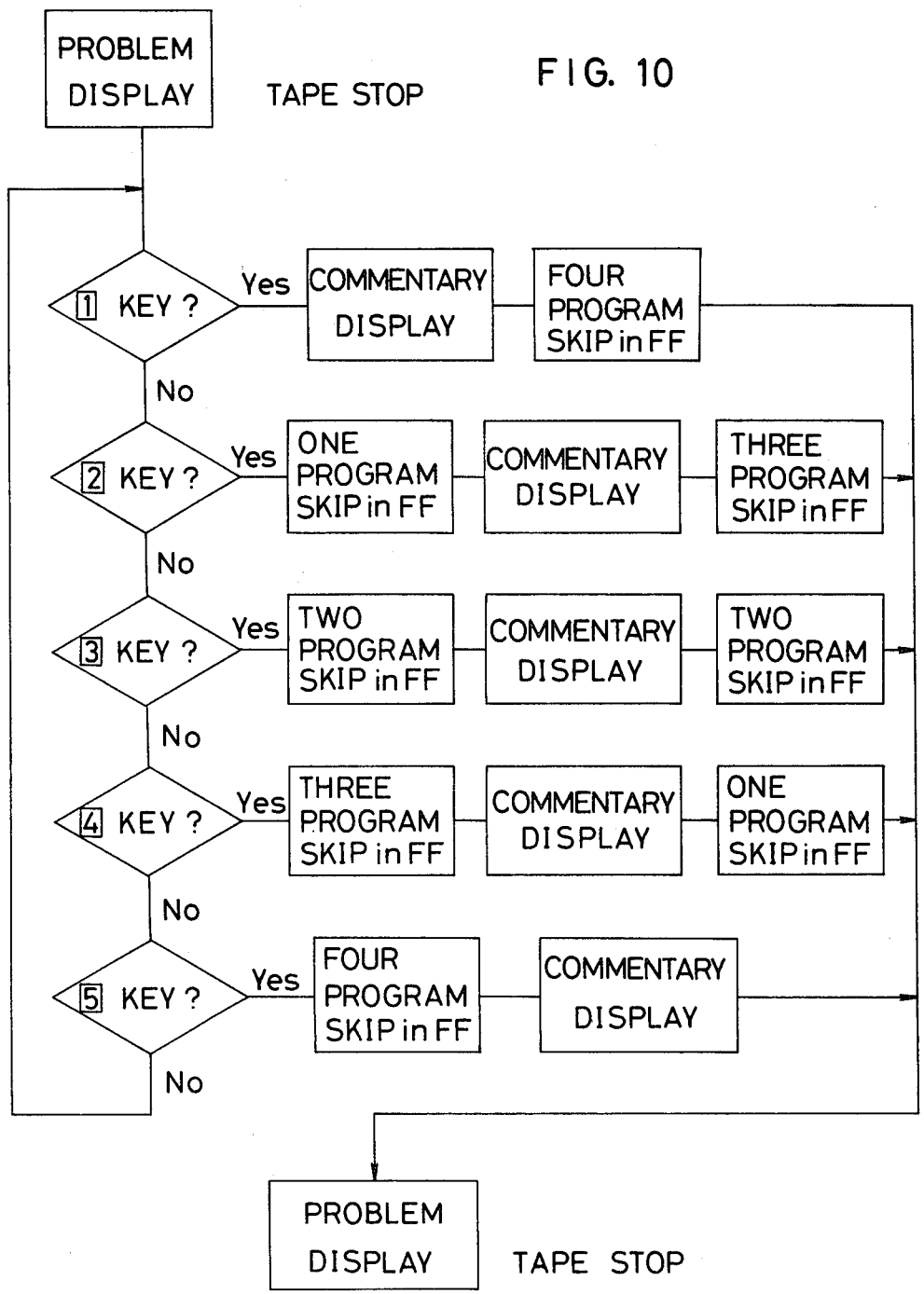
FIG. 10 is a flow chart for explaining an operation mode of the cassette tape player of FIG. 5.

FIG. 9 shows an example of the data recorded on the magnetic tape which is loaded on the audio cassette tape player 100, and FIG. 10 shows an operation flow responding to the answer key actuation.

The problem (A) and five typical answers are displayed on the entire screen of the TV set 120 when the data "27, 61, 00, BF, data for problem (A)" is applied from the audio cassette tape player 100 to the CPU 3. Then, the answer key actuation search mode is set by the data "80, 30, 11, 12, 13, 14". Thereafter, the tape feed drive is stopped by the data "90, 00".

When the answer key [2] is actuated by the student, the control signal "00100001" is applied to the eight-bit latch circuit 20 through the data bus DB-E. That is, the commentary data section for the answer key [1] is skipped and the commentary data for the answer key [2] is reproduced by the audio cassette tape player 100. That is, the commentary for the answer key [2] is displayed on the TV set 120 and announced through the speaker systems 140 and 141. Thereafter, the data "90, 13" is introduced from the audio cassette tape player 100 to the CPU 3, whereby the control signal "00100011" is developed from the CPU 3 toward the audio cassette tape player 100. Accordingly, the following three sets of commentary data are skipped, and the next problem data (B) is reproduced.

The invention being thus described, it will be obvious that the same may be varied in many ways. Such variations are not to be regarded as a departure from the spirit and scope of the invention, and all such modifications are intended to be included within the scope of the following claims.

What is claimed is:
1. An audio visual system comprising:
reproduction system means for developing audio sound information, digital picture data information, and digital operation instruction commands from a recording medium containing a plurality of data sections, each of said data sections having said audio information provided on a first track separate from a second track having said picture data information and operation instruction commands stored thereon, said audio information being recovered from said first track substantially simultaneously with the recovery of said picture data information and said operation instruction commands from said second track;
speaker system means responsive to the audio sound information developed from said reproduction system means for generating audio sound in accordance with said audio sound information developed by said reproduction system means;
video control means responsive to the picture data information and the operation instruction commands developed from said reproduction system means for providing a video signal in accordance therewith;
an image screen for providing a visual image in response to said video signal; and
input means connected to said reproduction system means for selecting a desired one of said data sections stored in said recording medium, said reproduction system being controlled in response to the selection of the desired data section via said input means and in response to said digital operation instruction commands recorded on said recording medium.

2. The audio visual system of claim 1, wherein said operation instruction commands include mode determination commands for determining the operation mode of said reproduction system means, wherein said video control means comprises:
reproduction system drive condition determination means responsive to said mode determination commands developed from said reproduction system means for developing a control signal indicating a desired drive condition of said reproduction system means;
said input means selecting a desired mode determination command indicative of the desired drive condition in response to selection thereof by said input means; and
driver means responsive to said control signal for driving said reproduction system means in the desired drive condition.

3. The audio visual system of claim 2, wherein said control signal comprises:
a normal playback control signal for placing said reproduction system means in the normal playback operation mode; and
a program skip control signal for skipping a desired number of data sections recorded on said recording medium while in a fast forward movement until the desired data section is reached, said reproduction system means developing said audio sound information, said digital picture data information, and said digital operation instruction commands associated with said desired data section when said desired data section is reached.

4. An audio visual system for generating a visual display on the screen of a television and for producing an audio sound corresponding thereto, said system comprising:

picture signal processing means connected to the television for producing a video signal, said video signal producing said visual display on the television screen;

input means connected to said picture signal processing means for developing a command in response to selection by said input means, said picture signal processing means receiving said command and developing a command operation signal therefrom;

tape player means connected to said picture signal processing means and responsive to said command operation signal for generating audio sound signals and instruction command signals therefrom in response thereto, said instruction command signals including pattern data and color data;

said picture signal processing means including,
first memory means for storing said pattern data therein,
second memory means for storing said color data therein,
means for combining said pattern data stored in said first memory means with said color data stored in said second memory means to produce combined picture data;
means for converting said combined picture data produced by said means for combining into a further video signal;
television monitor means for converting said further video signal into another visual display on the television screen; and
said tape player means producing an audible message in response to said sound signals substantially simultaneous to the generation of said another visual display on said television screen whereby said picture signal processing means controls the visual display on the screen of said television in response to the command developed by said input means and in response to said instruction command signals generated from said tape player means.

5. An audio visual system in accordance with claim 4 wherein said tape player means includes a recording tape for storing the recorded audio sound signals and the instruction command signals thereon, said recording tape containing a plurality of data sections, each of said data sections having said audio sound signals and said instruction command signals recorded thereon on parallel tracks thereby causing the audio sound signals and the instruction command signals to be generated from the recording tape of said tape player means substantially simultaneously.

6. An audio visual system in accordance with claim 5 wherein said instruction command signals are digital signals;
whereby the visual display on the television screen is controlled solely in a digital manner.

7. An audio visual system in accordance with claim 4 wherein said tape player means delivers said instruction command signals to said picture signal processing means in response to selection by said input means, said signals delivered to said picture signal processing means corresponding to the selection made by said input means.

8. An electronic learning aid for generating at least one problem and a series of answers on the screen of a television and for producing an audio output corresponding to a selected answer to said problem, said learning aid comprising:

picture signal processing means connected to said television for producing a video signal, said video signal producing said problem and said series of answers on the television screen;

input means connected to said picture signal processing means for selecting one of said series of answers and producing a command signal indicative thereof;

said picture signal processing means receiving said command signal and developing a command drive signal therefrom;

tape player means connected to said picture signal processing means and responsive to said command drive signal for developing audio sound signals and instruction command signals, said instruction command signals including pattern data and color data, said tape player means delivering said instruction command signals to said picture signal processing means corresponding to said selected answer;

said picture signal processing means including,
first memory means for storing said pattern data therein,
second memory means for storing said color data therein,
means for combining said pattern data stored in said first memory means with said color data stored in said second memory means to produce combined picture data,
means for converting said combined picture data produced by said means for combining into a further video signal;
television monitor means for converting said further video signal into a visual display on the television screen, said visual display being associated with said selected answer; and
said tape player means producing an audible commentary message associated with said selected answer in response to said audio sound signal substantially simultaneously with the generation of said visual display on said television screen.

9. The learning aid of claim 8 wherein said television screen is divided into a plurality of display areas; and
wherein said first and second memory means include memory arrays having individual addresses, each address corresponding to a separate area of said television screen.

10. The learning aid of claim 9 wherein said pattern data includes at least one pattern data word, each pattern data word containing information indicative of a visual pattern within one of said areas of said television screen.

11. The learning aid of claim 10 wherein said color data includes at least one color data word, each color data word containing information indicative of the color of the visual pattern and the color of the background of one of said areas of said television screen.

12. The learning aid of claims 8 or 11 wherein said pattern data and color data contain information indicative of changes of the displayed pattern and color.

13. The learning aid of claim 12 further comprising:
initialization means for generating an initial uniform background color in the television screen prior to receipt of said pattern data and color data.

14. The learning aid of claim 8 wherein said tape player means comprises a recording tape for storing the said recorded audio signals and the instruction command signals thereon, said recording tape containing a plurality of data sections, each of said data sections having said audio sound signals and said instruction command signals recorded thereon on parallel tracks, thereby causing the audio sound signals and the instruction command signals to be generated from the recording tape of said tape player means substantially simultaneously.

15. An electronic learning aid system for generating a visual display on a television screen and for commenting on a user response to problems presented on said visual display, said system comprising:

input means for allowing the user to respond to the problems presented in said visual display by selecting an answer thereto and producing an answer signal representative tape player means responsive to said answer signal for reading picture data information from a tape, said picture data information being indicative of desired changes of said visual display;

memory means for storing information corresponding to the visual display to be generated on said television screen;

means for altering the information stored in said memory means in response to said picture data information indicative of desired changes;

means for repeatedly and sequentially reading the information stored in said memory means and for converting said information into a video signal; and television monitor means including said television screen for converting said video signal into the visual display on said television screen.

16. The learning aid system of claim 15 wherein said picture data information includes pattern change data and color change data.

17. The learning aid system of claim 16 wherein said memory means includes:

first storage means for storing said pattern change data therein; and second storage means for storing said color change data therein.

18. The learning aid system of claim 17 wherein the means for reading and converting includes:

means for combining said pattern change data stored in said first storage means with said color change data stored in said second storage means.

19. The learning aid system of claim 18 wherein said television screen is divided into a plurality of displayed areas, and wherein said first and second memory means include memory arrays having individual addresses, each address corresponding to a separate area of said television screen.

20. The learning aid system of claim 19 wherein said pattern change data includes at least one pattern data word, each pattern data word containing information indicative of a visual pattern within one of said areas of said television screen.

21. The learning aid system of claim 20 wherein said color change data includes at least one color data word, each color data word containing information indicative of the color of the visual pattern and the color of the background within one of said areas of said television screen.

22. The learning aid system of claim 18, further comprising:

initialization means for generating an initial uniform background color prior to receipt of said pattern change data and color change data.

23. The learning aid system of claim 18 wherein said tape also includes audio information stored on the same portions of said tape as said picture data information, said picture data information and said audio information being read from said tape approximately simultaneously.

24. The learning aid system of claim 23 further comprising an audio reproduction system for converting said audio information on said tape into audible sounds.

* * * * *